United States Patent [19]
Krainin

[11] 3,782,734
[45] Jan. 1, 1974

[54] TALKING BOOK, AN EDUCATIONAL TOY WITH MULTI-POSITION SOUND TRACK AND IMPROVED STYLUS TRANSDUCER

[76] Inventor: Stanley Krainin, 401 Rutland Ave., Teaneck, N.J. 07666

[22] Filed: Mar. 15, 1971

[21] Appl. No.: 123,988

[52] U.S. Cl.................. 274/9 R, 35/35 C, 274/37, 274/42
[51] Int. Cl........ G11b 3/10, G11b 3/72, G11b 3/78
[58] Field of Search...................... 274/1 A, 9 R, 42, 274/37, 38; 35/35 C, 35 E

[56] References Cited
UNITED STATES PATENTS

| | | | |
|---|---|---|---|
| 983,061 | 1/1911 | Jetter | 274/37 |
| 1,013,421 | 1/1912 | Millet | 274/37 |
| 1,792,528 | 2/1931 | Bleyer | 274/42 R |
| 2,369,572 | 2/1945 | Kallman | 35/35 E |
| 2,528,611 | 11/1950 | Saffady | 274/42 R |
| 2,548,011 | 4/1951 | Frost | 35/35 C |
| 2,822,425 | 2/1958 | Hicks | 35/35 E |
| 2,997,306 | 8/1961 | Hicks | 274/42 R |
| 3,391,476 | 7/1968 | Sher | 35/35 C |
| 3,416,241 | 12/1968 | Weitzner | 35/35 C |

FOREIGN PATENTS OR APPLICATIONS

| | | | |
|---|---|---|---|
| 10,309 | 9/1969 | Japan | 35/35 C |

Primary Examiner—Louis R. Prince
Assistant Examiner—A. J. Mirabito

[57] ABSTRACT

For use in a talking book consisting of one or more pages containing visual material superimposed on or in juxtaposition with the sound grooves on each page, sets of undulated lateral or hill and dale sound grooves made an integral part of each page, each groove in a set recorded identically with every other groove in that set; a hand held stylus transducer capable of being held in a variety of positions as it is manually moved, its stylus tip engaging and reproducing sound from either wall of a sound groove in any set of grooves, and containing an integral tapered shield to protect the page and user from the substantially sharp point of the stylus should the transducer be mishandled on or off the page.

2 Claims, 7 Drawing Figures

INVENTOR.
BY Stanley Krainin

INVENTOR.
BY Stanley Krainin

TALKING BOOK, AN EDUCATIONAL TOY WITH MULTI-POSITION SOUND TRACK AND IMPROVED STYLUS TRANSDUCER

BACKGROUND OF THE INVENTION

This invention relates to an improved talking book and more particularly to adding as an integral part of each page of said book containing printed or written visual material, sets of undulated sound grooves; and to an improved hand held transducer stylus to be used with the said book and sound grooves.

Talking books have been made by extending or affixing separately recorded (acoustics or magnetic) sound tracks to the written or printed page in some arrangement so that correlation between sight and sound was achieved. Reproduction of sound in one instance (H.L. Samuels, U.S. Pat. No. 2,546,680 dated Mar. 27, 1951) was obtained by moving an edge guided slider with stylus that vibrated an embossed undulated hill and dale sound tape, one end of said tape connected to a diaphragm for sound amplification and extending along and in proximity to the visual material.

In another device (W. R. Hicks, U.S. Pat. No. 2,822,425, Feb. 4, 1958) again edge guided, an electromechanical pickup stylus transducer or a magnetic playback head was rigidly oriented in a slider and manually drawn along a sound track in proximity with the visual material to excite an audio amplifier and loud speaker. In the case of the stylus transducer, the sharp pointed stylus engaged a single hill and dale sound groove and had no protective device to prevent it from injuring the page or the user if mishandled.

In still another device (L.T.Frost, U.S. Pat. No. 2,548,011, dated Apr. 10, 1951) a magnetically recorded track was affixed to the written page. A pen-like transducer with a magnetic playback head and protruding guide arms, was positioned on the tape by engaging the guide arms in a groove in the page parallel to the magnetic tape. The transducer was designed to be held in a single position with respect to the page and manually moved along the magnetic track at a velocity approximating that at which the track was recorded and in a direction determined by the guide groove. The magnetic playback head excited an electronic amplifier and loud speaker.

These older designs required or implied careful alignment of the sound pickup device or transducer with the sound track through some form of edge or groove guide parallel to and removed from that recorded track. Further, the devices did not equally accommodate a normally left handed person since they appeared to be designed for a right handed one. Thirdly, previous designs were costly to fabricate in comparison with the proposed invention. Fourthly, in those devices employing sound grooves and a transducer with a needle-like stylus, the exposure of the sharp pointed stylus was a hazard to the user and others if it were improperly handled off the page and a hazard to the single, vulnerable sound groove if moved in other than its normally intended direction on the page. Finally, a single vulnerable groove or track providing sound and being the sole source of sound for the particular visual material on a page, limited the life of the talking book either through abusive wear or accidental damage to that groove.

SUMMARY OF THE INVENTION

An objective of this invention is to provide a talking book in which each page having visual material is supplemented with sets of undulated sound grooves, each set consisting of more than one duplicate sound groove describing visual material the latter which is normally but not limited to being superimposed or in juxtaposition with each set of sound grooves so that said configuration facilitates and achieves ease of engagement and movement of a manually held pen-like stylus transducer, accommodates lateral translation of the stylus from any groove to any other duplicate groove in case of groove damage or blockage, or transducer mishandling while transcribing, increases the longevity of sound reproduction since damaged sound grooves could be easily bypassed through use of adjacent duplicate grooves, and eliminates the need for edge or groove guides.

Another objective of this invention is to provide a talking book in which the pen-like stylus transducer is manually held with its pointed tip in contact with an undulated sound groove, in a variety of angular positions relative to the page and moved at a velocity approximately that at which the sound groove was recorded so that the configuration further yields satisfactory sound reproduction, accommodates the holding and writing habits of the user whether he or she is right or left handed, further increases the talking book's sound reproduction longevity by allowing many points of the stylus tip surface to contact either groove wall and encourages the use of the talking book through ease of operation.

Another objective is to provide a hand-held sound pick-up device or transducer with a universal and unique safety feature in which the relatively sharp or pointed end of the stylus used in the transducer is shielded by integral and rigid parts of the driven element of the transducer, so that the operator is protected from self inflicted injury from the sharp point and the sound grooves are not subjected to damage in misuse of the device.

DESCRIPTION OF THE DRAWINGS

An understanding of the foregoing and additional aspects of the invention may be gained from a consideration of the following detailed description and drawings in which.

DESCRIPTION OF THE PREFERRED EMBODIMENT

Figure 1:
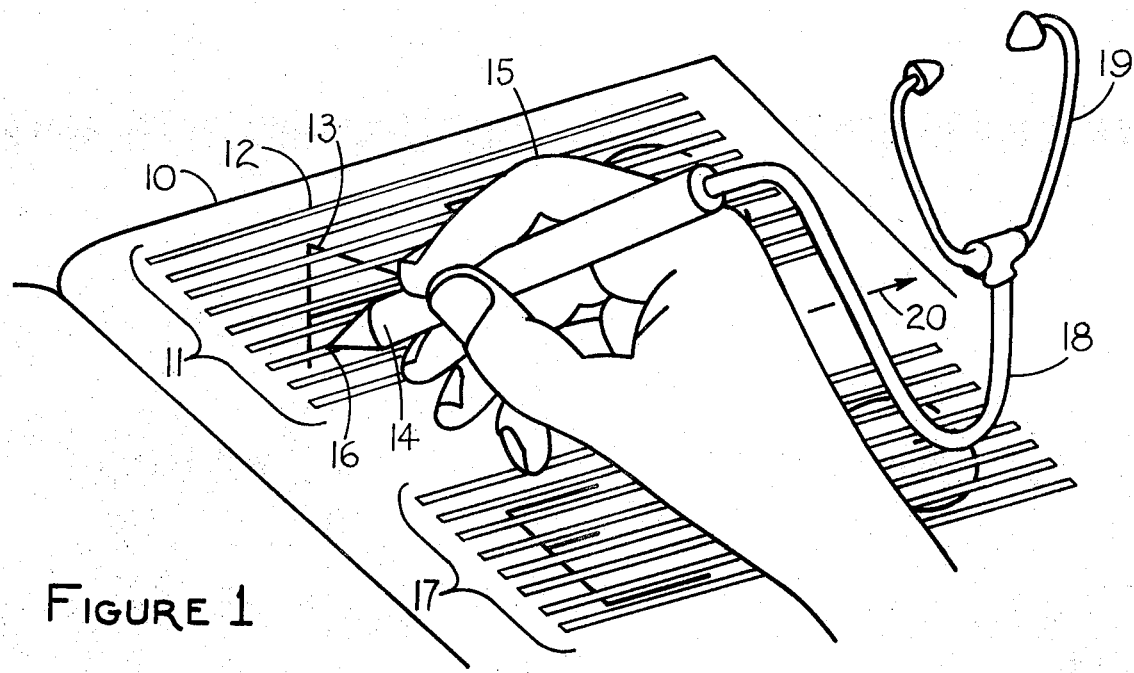
FIG. 1 is a perspective view showing the sound pick-up device, a pen-like stylus transducer, held in a working position by a right handed person, on the talking book page, the tip of the stylus engaging one of a plurality of identically recorded sound grooves constituting a set.

Referring more particularly to the drawings, there is shown in FIG. 1 a page 10 of the book or sheaf of pages preferably made of plastic or equivalent sheet material upon which a set 11 of lateral or hill and dale sound grooves 12 is impressed and the visual text 13 or information is printed or written. The grooves are molded into the page as in phonograph pressings while the text or information is printed or written in a normal way on the land between and adjacent to the sound grooves.

The pen-like stylus transducer 14, described later in detail, is shown manually held and moved for transcription by a right handed user 15 while the transducer's stylus 16 is made to engage any groove 12 of a plurality of identical sound grooves, here represented as set 11.

The right handed person will tend to use the upper walls of the lower sound grooves of each set to maintain unobstructed view of the visual material as shown in the illustration.

In its movement along a groove, the stylus may translate between identical sound grooves, typically due to groove damage, groove blockage or transducer mishandling, with only a minimal interruption of transcription.

Other sets 17 of sound grooves are used to functionally operate with other visual information.

Through the stylus 16 the transducer 14 converts the mechanical undulations in the sound grooves to sound pressure undulations which for example are guided through the flexible tubing 18 to the acoustical earphones 19. The transducer is moved preferably at the same velocity the sound grooves were recorded, which recording is shown made in the same direction of travel 20 which the visual text or information is read in this figure.

Figure 2:
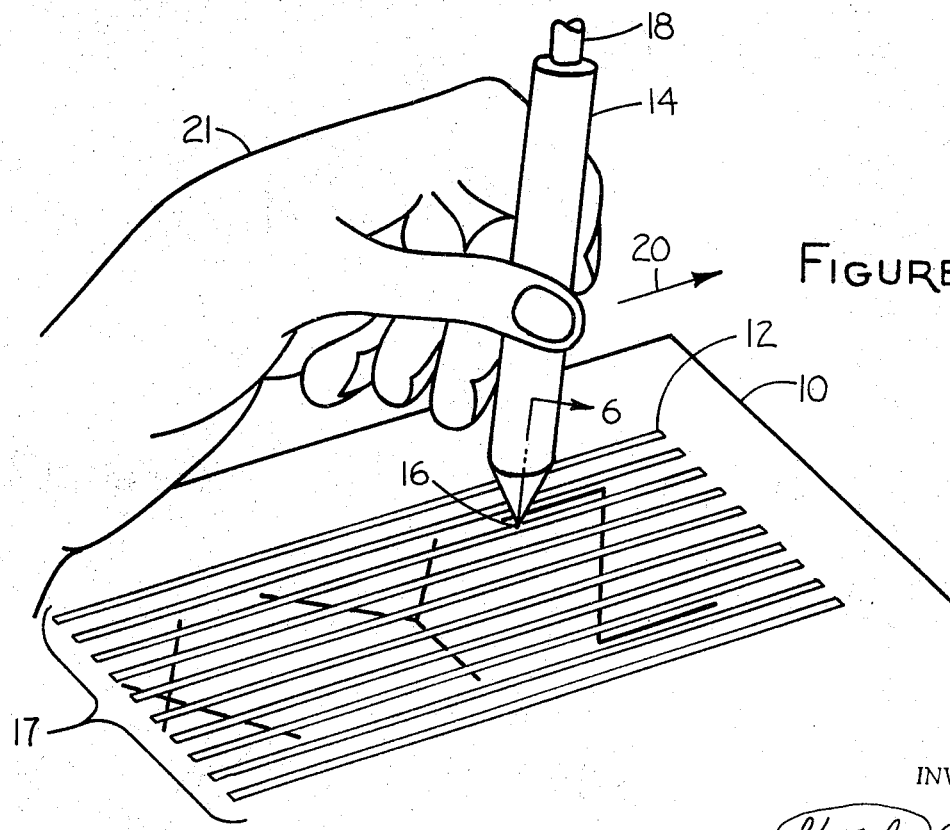
FIG. 2 is a perspective view similar to FIG. 1 except that the stylus transducer is held in a working position by a left handed person.

FIG. 2 is similar to FIG. 1 except that a left handed user 21 is illustrated. The left handed person will tend to use the lower walls of the upper sound grooves of each set of grooves in order to maintain an unobstructed view of the text.

Figure 6:
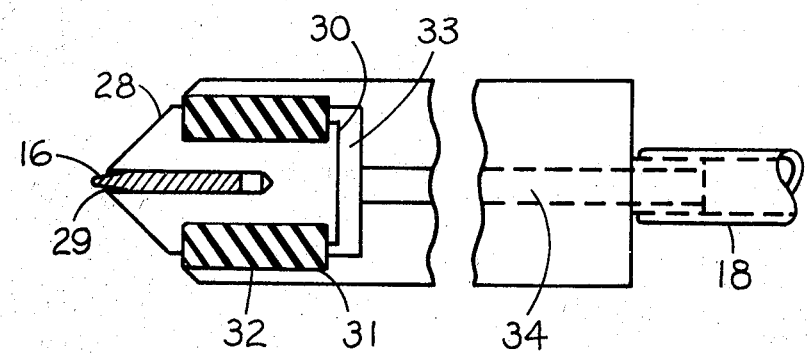
FIG. 6 is an enlarged diagrammatic Sectional View showing construction of the pen-like, sound pick-up stylus transducer with integral stylus and shield.

The transducer 14 is described in detail in FIG. 6. Its stylus 16 is shown in contact with a sound groove 12 in a page 10 of the talking book and is moved along that groove, translating to other grooves in the set 17 when necessary.

In both FIGS. 1 and 2, the visual text and the sound groove set are shown reading and operating left to right respectively and in the same direction. They may also be read and operate in opposite directions if so made that way. They may also be made parallel, oblique, perpendicular or curvilinear with respect to each other for added versatility.

Figure 3:
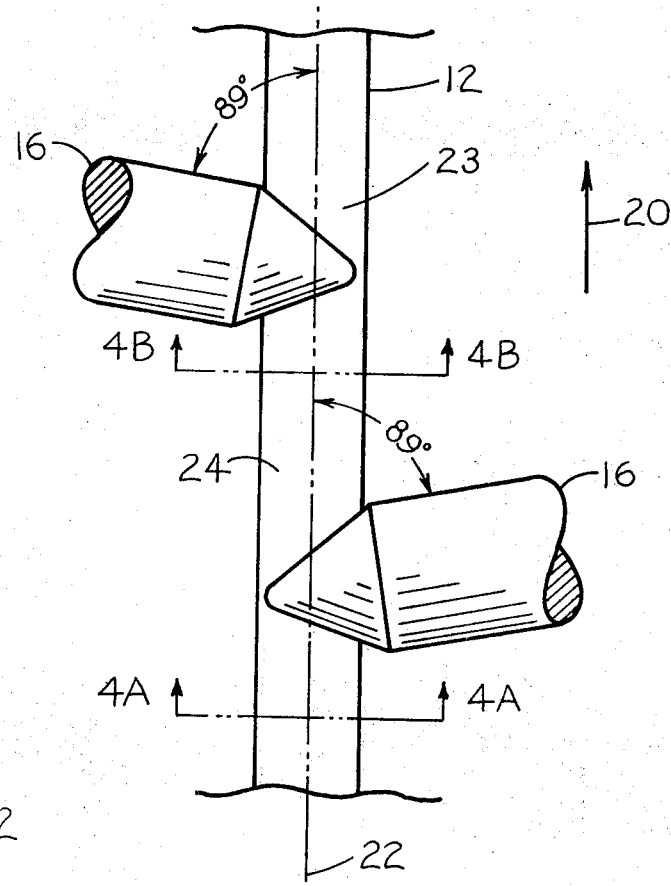
FIG. 3 is an enlarged diagrammatic Plan View showing projections of the transducer stylus in a horizontal plane of the sound groove and the angular limits thereof for contact of the stylus with that groove to reproduce satisfactory sound.
Figure 4B:
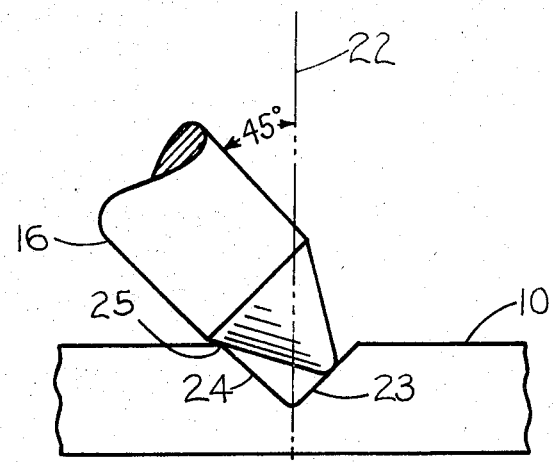
FIG. 4A and 4B are enlarged diagrammatic Sectional Views taken along lines 4A — 4A and 4B — 4B respectively in FIG. 3 showing projections of the transducer stylus in a plane transverse to the sound groove and the angular limits thereof for contact of the stylus with that groove to reproduce satisfactory sound.
Figure 4A:
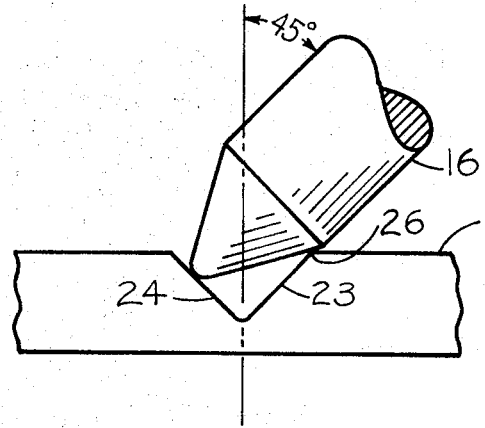
Figure 5:
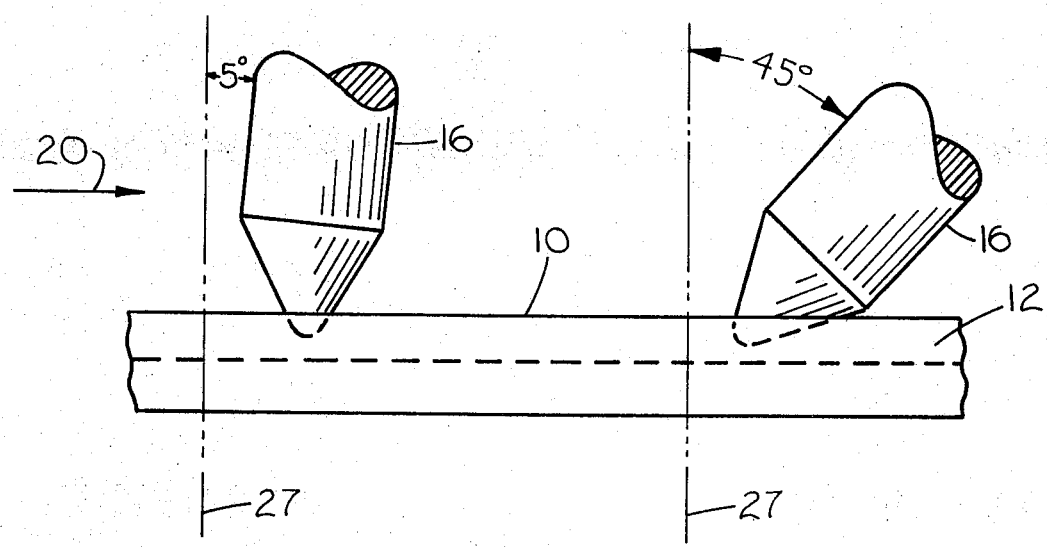
FIG. 5 is an enlarged diagrammatic Side View along the line of a sound groove showing projections of the transducer stylus upon a vertical plane through the center of a sound groove, and the angular limits thereof for contact of the stylus with that groove to reproduce satisfactory sound.

FIG. 3 shows the range of possible positions in context with FIGS. 4 and 5 the pen-like transducer stylus 16 may take with respect to a Plan View of the talking book page and of a sound groove 12 herein shown enlarged, to accommodate the pen holding habits of the user and to yield satisfactory sound from the lateral or hill and dale sound grooves embedded in the page. With the broken line 22 representing the edge of an imaginary vertical plane through the nominal center line of the groove and with the arrow 20 parallel and indicating direction of stylus travel, the transducer may be held in any position such that its stylus lies within an included angle of 178°, centered so that 89° is measured either side of that plane and its apex lies opposite to the direction of stylus travel 20. In this device, sound is intended to be obtained separately from undulations in either groove wall 23 and 24 rather than from both groove walls simultaneously as in conventional phonograph devices.

FIG. 4A and FIG. 4B show the range of possible positions in context with FIGS. 3 and 5, the pen-like transducer stylus 16 may take with respect to a typical sound groove 12 herein shown enlarged and in sectional view. The stylus is shown in contact with either groove wall 23 or 24 since sound pick-up is obtained from only a single wall undulation rather than from both walls. The stylus may be in any position within an included angle of 90°, measured 45° either side of the imaginary vertical plane through the nominal center line of the sound groove represented by the broken line 22. The side of the stylus or its protective shield makes contact with the top edge 25 or 26 respectively of the opposite wall of the sound groove providing physical support but contributing little to sound pickup.

FIG. 5 shows the range of possible positions in context with FIGS. 3, 4A and 4B the pen-like transducer stylus 16 may take with respect to a typical sound groove 12 herein shown enlarged and in side view. Sound pickup is obtained when the stylus is in any position included within an angle between 5° and 45° measured from imaginary planes 27 normal to the talking book page and transverse to the sound groove 12 with the stylus 16 inclined in the direction of stylus travel 20.

FIG. 6 shows the construction of the pen-like stylus transducer 14. Stylus 16 is rigidly fastened into a tapered conical or hyperboloid, light weight shield 28 which permits the stylus to protrude a maximum of one thirty-second inch and which is truncated to provide a skirt 29 with a maximum of one-sixteenth inch diameter. The shield is formed as part of a solid piston 30 positioned in the barrel 31 by a soft rubber or elastic sleeve 32. Sound undulations are generated by the piston in the cavity 33 when the rigidly connected stylus 16 is in contact with and is moved along a sound groove such that the stylus moves in accordance with the undulations of the sound groove wall. Sound is propagated through hole 34 in the barrel to the flexible tubing 18 which guides the sound to an output device such as acoustical earphone used as an example in FIG. 1.

I claim:

1. A talking book including at least one page having thereon visual material and substantially V shaped sound grooves which have signal information recorded thereon concerning said visual material and which signal information is adapted for reproduction by relative movement between said page and a substantially pointed penlike, manually held, sound pick-up stylus transducer, characterized in that the page has at least one set of two or more adjacent and parallel sound grooves thereon in which all of the grooves of each set have identical recorded information.

2. A talking book in accordance with claim 1 wherein said manually held sound pick-up stylus transducer comprises a barrel and a moving element which is resiliently supported within said barrel by an elastic cylinder and into which a substantially sharp stylus is permanently affixed and made an integral part of said moving element whose exposed end supporting the said stylus is conical in shape, the moving element is characterized by said shape including an angle of less than 88° and truncated at its apex to form a protective skirt not less than one-sixteenth inch in diameter about the said sharp stylus which protrudes not more than one thirty-second inch.

* * * * *